C. A. BERRY.
KNOB AND SPINDLE FASTENING.
APPLICATION FILED AUG. 14, 1909.
957,837.
Patented May 10, 1910.
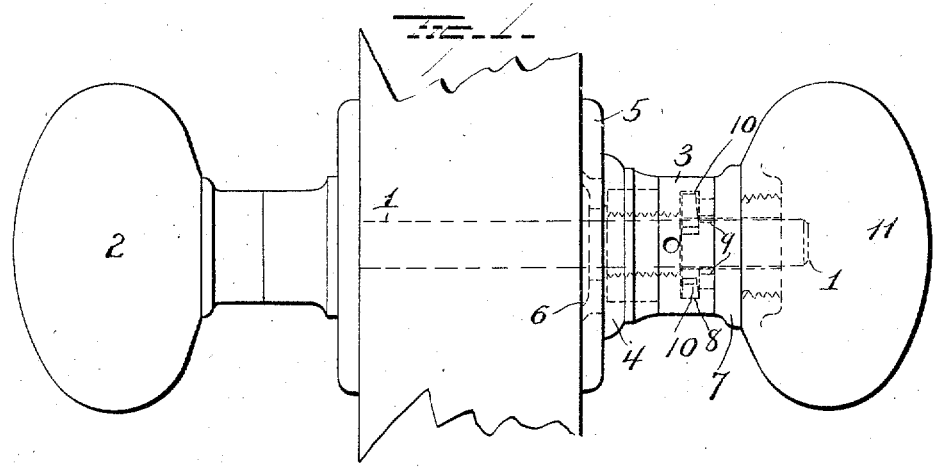
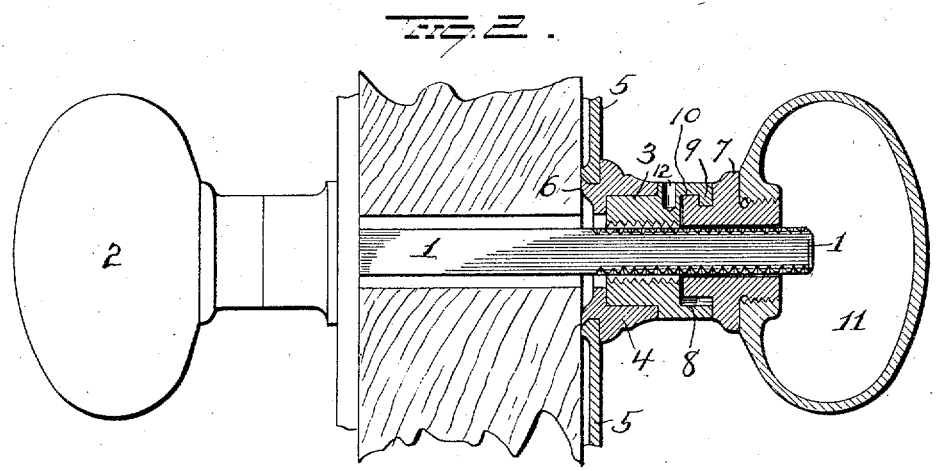
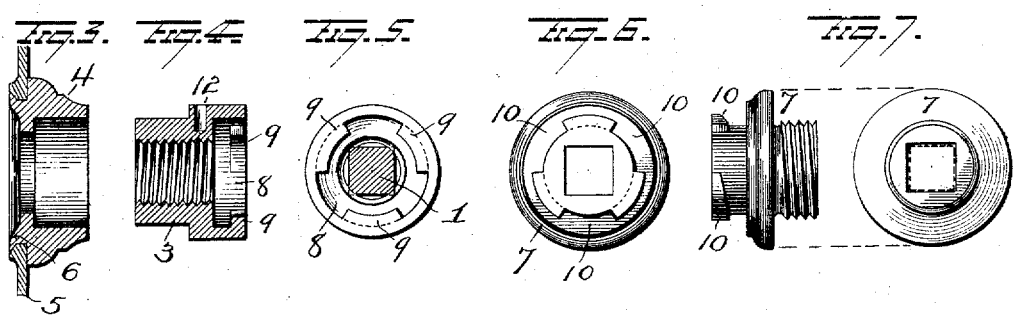
WITNESSES
E. J. Nottingham
S. J. Nottingham
INVENTOR
Charles A. Berry
By H. A. Seymour
Attorney

UNITED STATES PATENT OFFICE.

CHARLES A. BERRY, OF STAMFORD, CONNECTICUT, ASSIGNOR TO THE YALE & TOWNE MANUFACTURING COMPANY, OF STAMFORD, CONNECTICUT.

KNOB AND SPINDLE FASTENING.

957,837.      Specification of Letters Patent.      Patented May 10, 1910.

Application filed August 14, 1909. Serial No. 512,835.

*To all whom it may concern:*

Be it known that I, CHARLES A. BERRY, of Stamford, in the county of Fairfield and State of Connecticut, have invented certain new and useful Improvements in Knob and Spindle Fastenings; and I do hereby declare the following to be a full, clear, and exact description of the invention, such as will enable others skilled in the art to which it appertains to make and use the same.

My invention relates to an improvement in knob and spindle fastening, and it consists in the parts and combinations of parts and in the details of construction as will be more fully described and pointed out in the claims.

In the accompanying drawings, Figure 1 is a view showing two knobs attached to the spindle; Fig. 2 is a view in section through the escutcheon plate and inner knob, the spindle being shown in elevation; Fig. 3 is a view in section of the escutcheon plate and its attached thimble. Fig. 4 is a view in section of the sleeve; Fig. 5 is a view in end elevation of same; Figs. 6 and 7 are views of the removable shank, and Figs. 8 and 9 are views of the spindle.

1 represents the angular spindle permanently secured to the outer knob 2 in any approved manner, and provided at its opposite end, also angular in cross section, with threads cut in the angles or corners of the spindle, the threaded corners or angles of the spindle forming a screw which is engaged by the sleeve 3. This sleeve is provided with a threaded bore to engage the threaded end of the spindle 1, and is externally cylindrical, its inner end being reduced in diameter to snugly fit and rest within the thimble 4, which in the present instance, is permanently secured to the escutcheon plate 5 by upsetting the flange 6 of sleeve 4 against the rear face of escutcheon plate 5 as shown in Fig. 2. The outer exposed portion of sleeve 3 conforms in shape and size to the meeting ends of thimble 4, and knob shank 7, and is provided at its outer end with a recess 8 into which project the lugs 9. These lugs are of uniform size and shape, and are equally spaced to receive between them the wedge shaped lugs 10 on knob shank 7. The lugs 9 are removed from the rear wall of recess 8, thus leaving a free space in rear of said lugs, in which the lugs 10 on the knob shank rest when the parts are assembled, thus forming in effect a bayonet joint connection between the shank and sleeve.

The knob shank 7 is secured to the inner knob 11 in any approved manner, and is, as before explained, provided with the wedge shaped lugs 10, and also with an angular bore to receive the angular threaded end of the spindle 1.

In assembling the parts the spindle is passed through the door from the outer side and is secured in place by the screwing sleeve 3 onto the threaded end of same. By now placing the lugs 10 on knob shank 7 in position to enter between lugs 9 on sleeve 8, and then pushing in on the knob 11, and giving the sleeve 3 a partial turn, the knob 11 becomes firmly locked to the spindle, and as the knob shank has an angular bore for the passage of the end of the spindle, it will be seen that the power applied in turning the knob is transmitted directly to the spindle, and when the inner knob 11, which as before explained has an angular bore fitting the spindle 1, is turned, the sleeve which is screwed onto the spindle turns with the latter, the intermeshing lugs 9 and 10 preventing endwise separation of the knob 11 and sleeve 3.

What is ordinarily the shank of a knob, is in this improvement, divided into two parts to wit: the threaded sleeve 3, which as before explained screws onto the spindle and into the thimble 4, and serves as a center for the rotation of the knob and as a means for accurately adjusting the parts to doors of different thickness, and the stub shank 7 having lugs to engage the lugs in the recesses of sleeve 3.

The sleeve 3 may be provided with a socket 12 for the insertion of the end of a nail or other like device for giving the sleeve the necessary partial turn to lock the knob 11 in place and also for turning the sleeve in a direction to release the knob.

It is evident that many slight changes might be resorted to in the relative arrangement of parts shown and described without departing from the spirit and scope of my invention; hence I would have it understood that I do not wish to confine myself to the exact construction and arrangement of parts shown and described, but Having fully described my invention what

I claim as new and desire to secure by Letters-Patent, is:—

1. The combination with a knob spindle having an angular end and threaded section, of a sleeve mounted to rotate with the knob and having a threaded bore to engage the threaded section of the spindle, and a knob and knob shank the latter having an angular bore to receive the angular end of the spindle, the adjacent ends of the sleeve and knob shank having interlocking lugs for detachably connecting the knob to the sleeve against endwise separation, the contacting faces of the lugs on one of said parts being cam shaped whereby the knob shank will be drawn into contact with the end of the sleeve.

2. The combination with a plate and a thimble secured thereto, of a knob spindle having a threaded angular end, a sleeve mounted to rotate in the thimble and having a threaded bore to engage the threaded spindle and a knob the shank of which has an angular bore to receive the angular spindle, the adjacent ends of the sleeve and knob shank having interlocking lugs for detachably connecting the knob to the sleeve against endwise separation, the contacting faces of the lugs on one of said parts being cam-shaped whereby the knob shank will be drawn into contact with the end of the sleeve.

In testimony whereof, I have signed this specification in the presence of two subscribing witnesses.

CHARLES A. BERRY.

Witnesses:
 PETER F. AUGANBRANN,
 REINHULD SCHOELL.